United States Patent
Chen (10) Patent No.: US 11,188,535 B2
(45) Date of Patent: Nov. 30, 2021

(54) DISTRIBUTED JOIN OPERATION PROCESSING METHOD, APPARATUS, DEVICE, AND STORAGE MEDIUM

(71) Applicant: Beijing OceanBase Technology Co., Ltd., Beijing (CN)

(72) Inventor: Mengmeng Chen, Hangzhou (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

(21) Appl. No.: 17/085,521

(22) Filed: Oct. 30, 2020

(65) Prior Publication Data
US 2021/0049173 A1 Feb. 18, 2021

Related U.S. Application Data

(63) Continuation of application No. PCT/CN2019/096478, filed on Jul. 18, 2019.

(30) Foreign Application Priority Data

Aug. 31, 2018 (CN) .......................... 201811015813.2

(51) Int. Cl.
*G06F 16/2453* (2019.01)
*G06F 16/2455* (2019.01)
*H04L 29/08* (2006.01)

(52) U.S. Cl.
CPC .... *G06F 16/24544* (2019.01); *G06F 16/2456* (2019.01); *G06F 16/24537* (2019.01); *H04L 67/10* (2013.01)

(58) Field of Classification Search
CPC ......... G06F 16/24544; G06F 16/24537; G06F 16/2456; H04L 67/10
See application file for complete search history.

(56) References Cited

U.S. PATENT DOCUMENTS

9,501,527 B1 * 11/2016 Chainani ............ G06F 16/24544
10,642,840 B1 * 5/2020 Attaluri ............... G06F 16/2255
(Continued)

FOREIGN PATENT DOCUMENTS

| CN | 101916261 | 7/2013 |
| CN | 104572727 | 4/2015 |

(Continued)

OTHER PUBLICATIONS

Tian et al., "Joins for Hybrid Warehouses: Exploiting Massive Parallelism in Hadoop and Enterprise Data Warehouses", pp. 373-384 (Year: 2015).*

(Continued)

*Primary Examiner* — Mark D Featherstone
*Assistant Examiner* — Kweku William Halm
(74) *Attorney, Agent, or Firm* — Fish & Richardson P.C.

(57) ABSTRACT

Disclosed herein are methods, systems, and apparatus, including computer programs encoded on computer storage media, for distributed data processing. One of the methods includes: generating a first Bloom filter based on data of a local device, and sending the first Bloom filter to a remote device; receiving a second Bloom filter from the remote device, wherein the second Bloom filter is generated by the remote device based on data of the remote device; filtering data of the local device by using the first Bloom filter and the second Bloom filter to produce successfully filtered data and unsuccessfully filtered data; and performing a join operation on unsuccessfully filtered data.

18 Claims, 4 Drawing Sheets

(56) References Cited

U.S. PATENT DOCUMENTS

| | | | | |
|---|---|---|---|---|
| 10,642,994 | B1* | 5/2020 | Allen | H04L 9/0861 |
| 2011/0307447 | A1* | 12/2011 | Sabaa | G06F 16/24556 |
| | | | | 707/637 |
| 2014/0211659 | A1* | 7/2014 | Abraham | H04W 52/0209 |
| | | | | 370/254 |
| 2014/0337314 | A1* | 11/2014 | Potapov | G06F 3/0611 |
| | | | | 707/714 |
| 2017/0031967 | A1 | 2/2017 | Chavan et al. | |
| 2017/0060970 | A1 | 3/2017 | Bhide et al. | |
| 2019/0121890 | A1* | 4/2019 | Chainani | G06F 16/24537 |

FOREIGN PATENT DOCUMENTS

| | | |
|---|---|---|
| CN | 105187468 | 12/2015 |
| CN | 105554122 | 5/2016 |
| CN | 105718455 | 6/2016 |
| CN | 106372190 | 2/2017 |
| CN | 106407485 | 2/2017 |
| CN | 106445944 | 2/2017 |
| CN | 108156154 | 6/2018 |
| CN | 108205571 | 6/2018 |
| CN | 109271408 | 1/2019 |

OTHER PUBLICATIONS

Tian et al., "Building a Hybrid Warehouse: Efficient Joins between Data Stored in HDFS and Enterprise Warehouse", p. 21:1-21:35 (Year: 2016).*

Taewhi et al., "Join Processing Using Bloom Filter in MapReduce" pp. 100-105 (Year: 2012).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/096478, dated Sep. 27, 2019, 9 pages (with partial English translation).

* cited by examiner

DISTRIBUTED JOIN OPERATION PROCESSING METHOD, APPARATUS, DEVICE, AND STORAGE MEDIUM

CROSS-REFERENCE TO RELATED APPLICATIONS

This application is a continuation of PCT Application No. PCT/CN2019/096478, filed on Jul. 18, 2019, which claims priority to Chinese Patent Application No. 201811015813.2, filed on Aug. 31, 2018, and each application is hereby incorporated by reference in its entirety.

TECHNICAL FIELD

Embodiments of the present specification relate to the data processing field, and in particular, to distributed join operation processing methods, apparatuses, devices, and storage mediums.

BACKGROUND

The join operation is an important data operation of a relational database, and join operation efficiency is often vital to the entire database. In a database query optimization technology, join operations can be optimized in various methods. Join operation sequences and specific algorithms are important considerations. In a distributed database, data of different forms or partitions is usually distributed on different physical nodes, and a join operation across nodes is usually inevitable. In this case, in addition to efficiency, multiple factors such as data transmission and multi-node concurrency need to be considered.

In a conventional database, an important distributed join optimization method is to use a Bloom filter to create a Bloom filter based on data on one side of the join and to filter data on the other side by using the filter, so as to reduce unnecessary data transmissions.

A Bloom filter is a common data structure and can be used to filter data. The Bloom filter is essentially a bitmap and a hash function. A process of creating a Bloom filter is as follows: For each element (i.e., data) in a data set, the hash function is used to set an index corresponding to a hash value in the bitmap to 1 (if the index is already 1, the step is ignored). After each element in the entire data set is processed, the bitmap (i.e., the "Bloom filter") is created. The created Bloom filter can be used to verify whether a given element exists in the data set used to create the Bloom filter. When an element is given, whether the element belongs to the data set can be determined by determining whether an index corresponding to a hash value of the element in the Bloom filter is 1.

SUMMARY

Embodiments of the present specification provide distributed join operation methods, apparatuses, devices, and storage mediums, to implement better Bloom filtering performance.

According to a first aspect, the embodiments of the present specification provide a distributed join operation processing method, including the following: generating a first Bloom filter based on a data set of a local end, and sending the first Bloom filter to a remote end; receiving a second Bloom filter sent by the remote end, where the second Bloom filter is generated by the remote end based on a data set of the remote end; filtering data in the data set of the local end by using the first Bloom filter and the second Bloom filter; and performing a join operation on unsuccessfully filtered data.

According to a second aspect, the embodiments of the present specification provide a distributed join operation processing apparatus, including the following: a first Bloom filter module, configured to generate a first Bloom filter based on a data set of a local end, and send the first Bloom filter to a remote end; a second Bloom filter module, configured to receive a second Bloom filter sent by the remote end, where the second Bloom filter is generated by the remote end based on a data set of the remote end; a Bloom filtering execution module, configured to filter data in the data set of the local end by using the first Bloom filter and the second Bloom filter; and a join operation module, configured to perform a join operation on unsuccessfully filtered data.

According to a third aspect, the embodiments of the present specification further provide a computer device, including the following: a memory, configured to store a computer program; and a processor, configured to execute the computer program to perform the steps of the previously described method.

According to a fourth aspect, the embodiments of the present specification further provide a computer-readable storage medium. The computer-readable storage medium stores a computer program, and the computer program is executed by a processor to perform the steps of the previously described method.

Beneficial effects of the embodiments of the present specification are as follows:

The Bloom filter sent by the remote end is received, and filtering is performed by using the Bloom filter of the local end and the Bloom filter of the remote end. In other words, according to the technical solutions provided in the embodiments of the present specification, Bloom filtering is bilateral, that is, a filter is created and filtering is performed at each end instead of only creating a filter based on a data set of one end and performing filtering at the other end. Therefore, according to the technical solutions provided in the embodiments of the present specification, filtering performance is better and a filtering effect is better, that is, Bloom filtering performance is better.

DESCRIPTION OF EMBODIMENTS

For better understanding of the previous technical solutions, the following describes the technical solutions in the embodiments of the present specification in detail by using the accompanying drawings and specific embodiments. It should be understood that the embodiments of the present specification and specific features in the embodiments are detailed descriptions of the technical solutions in the embodiments of the present specification, but not a limitation on the technical solutions in the embodiments of the present specification. The embodiments of the present specification and the technical features in the embodiments can be mutually combined without conflicting with each other.

Figure 1:
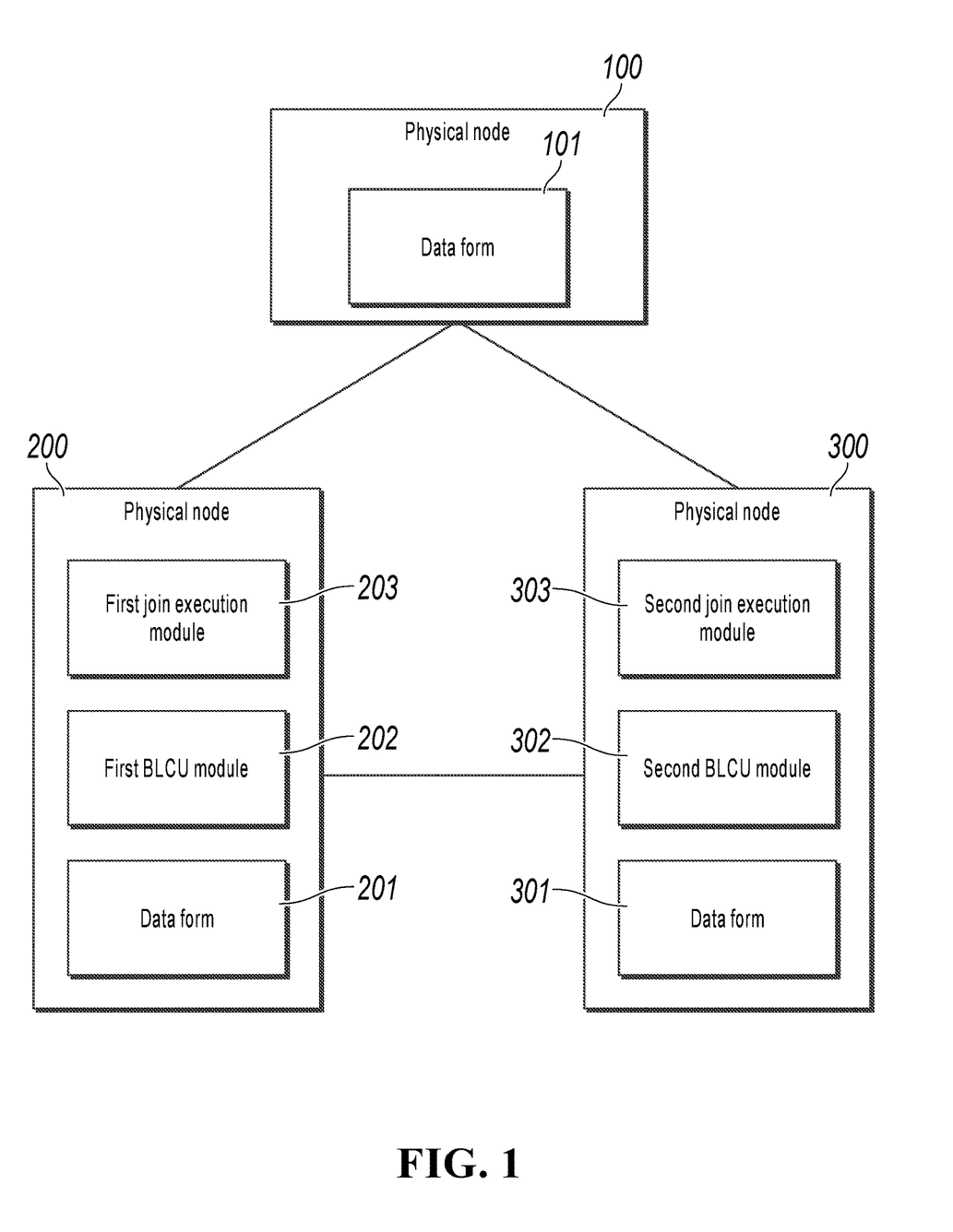
FIG. 1 is a schematic architectural diagram illustrating a system, according to an embodiment of the present specification.

The technical solutions provided in the embodiments of the present specification are applied to a distributed database system. Two data sets (including forms or partitions) of different physical nodes in the distributed database need to be joined to one data set. In other words, a join operation needs to be performed on two data sets of different physical nodes. To complete a final join operation, data of different physical nodes needs to be transmitted to the same physical node through a network. This process is referred to as "data redistribution". A system shown in FIG. 1 is used as an example. Assume that a join operation needs to be performed on a data form 201 of a physical node 200 and a data form 301 of a physical node 300. In this case, a first Bloom filter creation/use module 202 on the physical node 200 generates a first Bloom filter based on the data form 201 and sends the first Bloom filter to the physical node 300, receives a second Bloom filter sent by the physical node 300, filters the data form 201 by using the first Bloom filter and the second Bloom filter, and sends unsuccessfully filtered data to a first join execution module 203. The first join execution module 203 writes the data into a data form 101 of a physical node 100. A second Bloom filter creation/use module 302 on the physical node 300 generates the second Bloom filter by using the data form 301 and sends the second Bloom filter to the physical node 200, receives the first Bloom filter sent by the physical node 200, performs filtering by using the first Bloom filter and the second Bloom filter, and sends unsuccessfully filtered data to a second join execution module 303. The second join execution module 303 writes the data into the data form 101 of the physical node 100.

Figure 2:
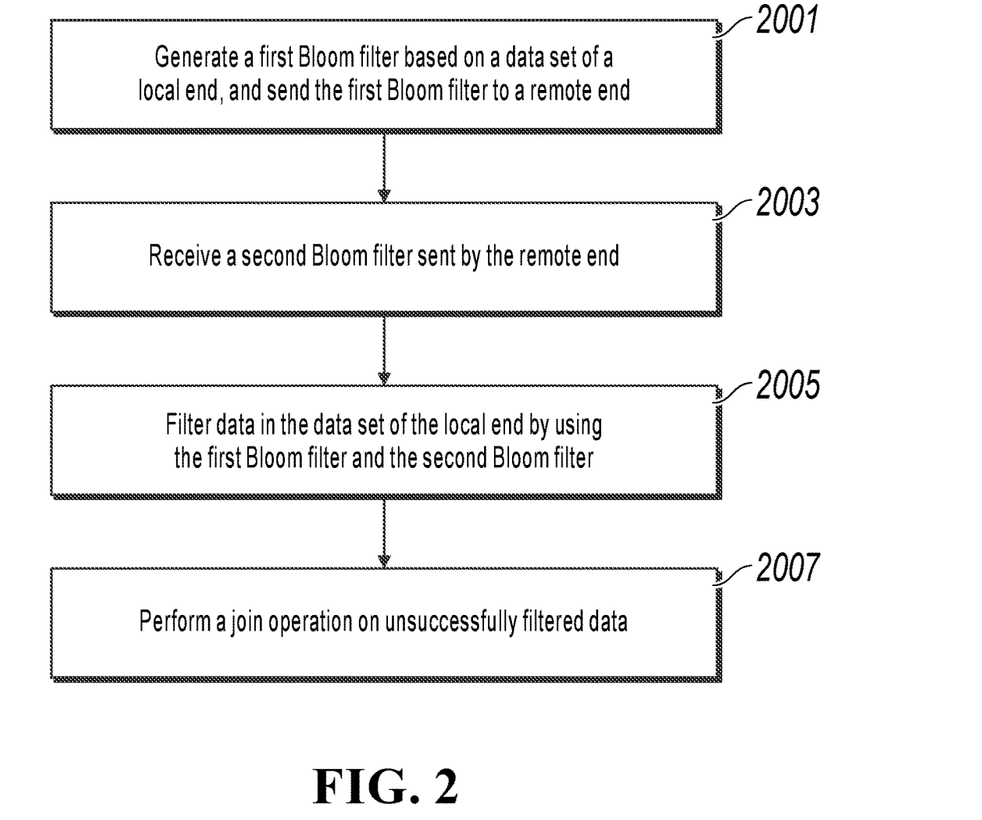
FIG. 2 is a flowchart illustrating a method in a first aspect according to an embodiment of the present specification.

According to a first aspect, an embodiment of the present specification provides a distributed join operation processing method. As shown in FIG. 2, the method includes the following steps.

Step 2001: Generate a first Bloom filter based on a data set of a local end, and send the first Bloom filter to a remote end.

In this embodiment of the present specification, if a join operation needs to be performed on data sets distributed on two physical nodes, one of the physical nodes is referred to as a local end, and the other physical node is referred to as a remote end.

In this embodiment of the present specification, the data set can be a data form, or can be a data partition.

Step 2003: Receive a second Bloom filter sent by the remote end, where the second Bloom filter is generated by the remote end based on a data form of the remote end.

Step 2005: Filter data in the data set of the local end by using the first Bloom filter and the second Bloom filter.

Assuming that a filtering condition is that values of the C1th column in the two data sets are the same, filtering specifically refers to calculating a hash value of the C1th column of data, and searching the Bloom filter for a value of an index corresponding to the hash value. If the value is 1, values of the C1th column for data in a certain row in the two data sets are the same, that is, filtering fails.

In this embodiment of the present specification, data in the data set can be filtered by row, or data in the data set can be filtered in batches.

Step 2007: Perform a join operation on unsuccessfully filtered data.

To be specific, the data in the row or the value (or the hash value) of the C1th column for the data in the row is written into the data form 101.

According to the method provided in this embodiment of the present specification, the Bloom filter sent by the remote end is received, and filtering is performed by using the Bloom filter of the local end and the Bloom filter of the remote end. In other words, according to the technical solution provided in this embodiment of the present specification, Bloom filtering is bilateral, that is, a filter is created and filtering is performed at each end instead of only creating a filter based on a data set of one end and performing filtering at the other end. Therefore, according to the method provided in this embodiment of the present specification, filtering performance is better and a filtering effect is better, that is, Bloom filtering performance is better.

In an implementation of step 2005, the data in the data set of the local end can be filtered separately by using the first Bloom filter and the second Bloom filter. Because the Bloom filter is essentially a bitmap, performing filtering by using the Bloom filter means determining a value of an index in the bitmap that corresponds to a hash value of a corresponding column of data. To improve filtering efficiency, the first filter and the second filter can be combined to obtain a bilateral Bloom filter. Correspondingly, in an implementation of step 2005, the data in the data set can be filtered by using a combined bilateral Bloom filter.

Combining the filters specifically means performing an OR operation on corresponding values in the two filters.

To improve filtering efficiency, system concurrency, a throughput of a physical node, and a join processing speed, in the method provided in this embodiment of the present specification, a Bloom filter can be dynamically created and sent, so that the remote end can perform filtering based on the received Bloom filter in a timely manner. Correspondingly, in step 2001, specifically, in the process of reading the data set of the local end, a first Bloom filter is periodically generated and is sent to the remote end. The period of generating and sending a first Bloom filter can be a time period, or can be a period of a quantity of data rows. Assume that data is read from a lower-layer data set by row based on a Bloom filter creation/use module. A time period is used as an example. In each time period, the Bloom filter creation/use module creates a first Bloom filter by using data read in the current time period. Alternatively, in each time period, the Bloom filter creation/use module creates a first Bloom filter by using data read in the current time period, and combines the newly created Bloom filter with a previously created Bloom filter. Alternatively, in each time period, the Bloom filter creation/use module creates a first Bloom filter by using data read in the current time period and previously read data. Assume that data is read from a lower-layer data set by row based on a Bloom filter creation/use module. A period of a quantity of data rows is used as an example. Each time N rows of data are read, a first Bloom filter is created by using the N rows of data read in the current period. Alternatively, each time N rows of data are read, a first Bloom filter is created by using the N rows of data read in the current period, and the newly created Bloom filter is combined with a previously created Bloom filter. Alternatively, each time N rows of data are read, a first Bloom filter is created by using the N rows of data read in the current period and previously read data.

Because the technical solution provided in this embodiment of the present specification is a bilateral symmetric operation, a second Bloom filter is periodically generated and is sent at the remote end based on the previously described implementation. Correspondingly, in a specific implementation of step 2003, a second Bloom filter sent by the remote end is periodically received.

Periods of creating and sending a Bloom filter by the local end and the remote end can be the same or different, and the periods can have the same type or different types.

Further, if the second Bloom filter and the first Bloom filter are combined, each time a second Bloom filter is received, the currently received second Bloom filter is combined with a first Bloom filter that is generated most recently; or each time a second Bloom filter is received, the currently received second Bloom filter is combined with a bilateral Bloom filter currently used for filtering; or each time a first Bloom filter is generated, the currently generated Bloom filter is combined with a second Bloom filter that is received most recently. Correspondingly, in an implementation of step 2005, the data in the data set of the local set can be filtered by using a latest bilateral Bloom filter.

Further, if it is not necessary to combine the first Bloom filter and the second Bloom filter, in step 2005, each time a first Bloom filter is generated or a second Bloom filter is received, the data in the data set can be filtered by using the Bloom filter that is generated or received most recently.

In the implementation of periodically creating a Bloom filter and performing filtering, because the Bloom filter is not created by using all data in the data set, there can be a filtering error. To reduce the filtering error, successfully filtered data can be temporarily stored in a cache, and filtered by using a subsequent Bloom filter. A bilateral Bloom filter is used as an example. Assume that cached data filtered by using the Mth bilateral Bloom filter is further filtered by using the (M+1)th bilateral filter until filtering fails or the last Bloom filter is used, or data in a cache is filtered only by using the last Bloom filter.

According to the method provided in this embodiment of the present specification, after all data in the data set of the local ends is read, the data set sends end of scanning or end of file (EOF) information to a Bloom filter creation/use module. The local end sends a first end of scanning instruction to the remote end when receiving the information and receiving no end of scanning instruction sent by the remote end, to notify the remote end that all the data of the local end is scanned. After receiving a second end of scanning instruction sent by the remote end, the local end filters the data in the data set of the local end by using a first Bloom filter that is generated for the last time.

Figure 3:
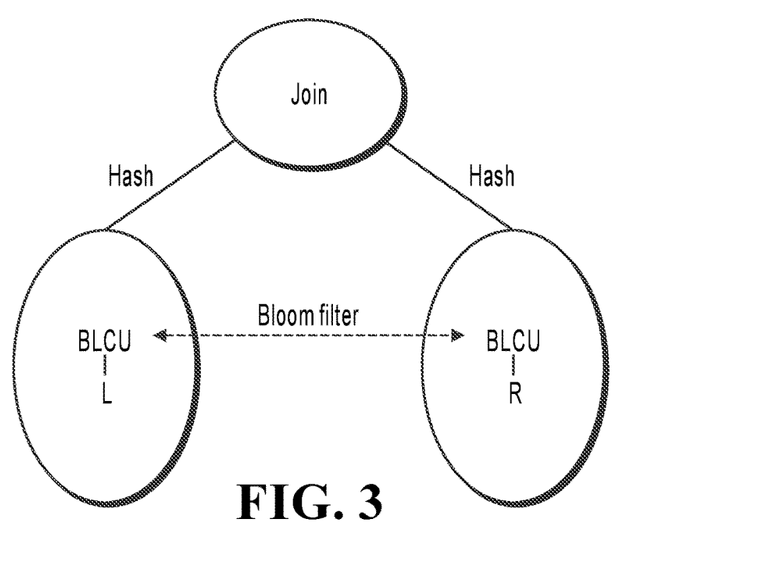
FIG. 3 is a schematic diagram illustrating a bilateral Bloom filter, according to an embodiment of the present specification.

With reference to a specific application scenario, the following describes in detail the embodiment solution of "bilateral Bloom filtering" provided in the embodiments of the present specification. As shown in FIG. 3, two operations BLC and BLU in a conventional Bloom filter are replaced with one operation Bloom Filter Create/USE (BLCU for short). Logic of the module is as follows: First Bloom filter A is periodically created for data in an input data set and is sent to a BLCU operator paired with the first Bloom filter A through network RPC. First Bloom filter A is locally combined with a periodically received second Bloom filter to generate new Bloom filter B, and filtering is performed on input data in each row by using periodically received Bloom filter B. If the filtering succeeds (the row does not exist in the Bloom filter), the data in the row is locally cached; otherwise (the row exists), the data in the row is sent to an upper-layer join operation module for processing based on the previously described data redistribution method. After the local scanning is completed, an EOF (end of scanning) instruction is sent to the remote end. When an EOF instruction sent by the remote end is received, a new Bloom filter is generated and processing is performed based on the previously described process. The difference lies in that if the filtering succeeds, the row is directly discarded (without being cached).

Figure 4:
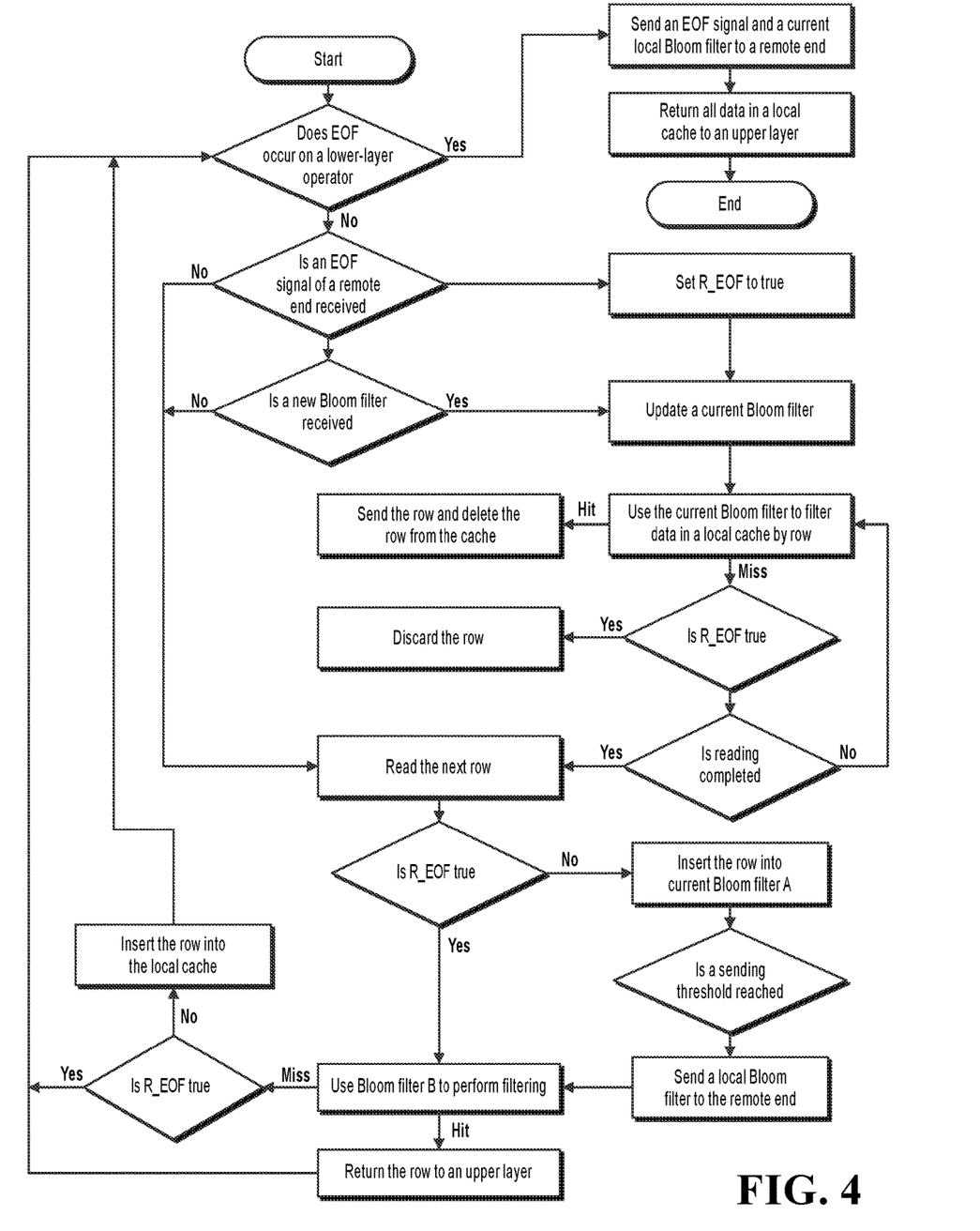
FIG. 4 is a flowchart illustrating another method in the first aspect, according to an embodiment of the present specification.

Assuming that a join operation needs to be performed on the data form 201 of the physical node 200 and the data form 301 of the physical node 300 in FIG. 1, a processing process is shown in FIG. 4.

A flag index R_EOF is used to indicate whether an EOF instruction sent by the remote end is received and/or whether EOF information is received. In this embodiment, a value of the flag index R_EOF is a Boolean logic value, and "true" indicates "received". In actual applications, another method can be used for the value, or a specific meaning of each value is defined.

Inserting data into Bloom filter A means updating the Bloom filter by using the data in the row.

It is worthwhile to note that in this embodiment of the present specification, a locally generated Bloom filter can be updated in real time based on a read data row. Correspondingly, periodically creating a Bloom filter actually means updating a Bloom filter in real time.

If it is determined that a sending threshold is reached, local Bloom filter A is sent to the remote end. If not, Bloom filter B is used for filtering.

If EOF information sent by a lower-layer operator (i.e., a data form) is not received, and it is further determined that an EOF signal of a remote end is received, a flag index is set to true, and it is further determined whether a new Bloom filter is received.

The method provided in this embodiment of the present specification has the following beneficial effects:

1. After the BLCU operation is introduced, the operation can be performed simultaneously on the left and right sides of join (instead of being performed on the left side before optimization), which improves scheduling flexibility and system-wide concurrency. For example, when L and R tables are located on different nodes, performing the operation simultaneously on the left and right sides can ensure the full use of local IOs of multiples nodes, thereby maximizing the entire throughput.

2. Performing the operation on all branches simultaneously can further ensure that data rows are returned to a user as soon as possible. In a conventional method, because scanning is performed on the left side before filtering on the right side, the time of returning the first row is later than the scanning of the left table. By contrast, through bilateral Bloom filtering in this solution, rows on the left and right sides that can be joined can be returned to the upper layer of the join as soon as possible, and therefore, the rows are returned to the user as soon as possible. In an interactive query scenario, returning some data as soon as possible brings a great application value to the user.

3. The conventional solution is susceptible to incorrect determination of an optimizer. When the optimizer incorrectly determines a large table in the left table as a small table to generate a Bloom filter, data in the large table may be used to filter data in a small table, causing low execution efficiency. Because the left and right sides are executed simultaneously, it can be ensured that a filtering operation is performed simultaneously. After scanning of a small table is completed, the operation is rolled back to the conventional one-sided filtering method, so that robustness of the whole plan is ensured.

4. The bilateral Bloom filtering solution can ensure bilateral filtering. Each side of the join can use a Bloom filter of the opposite side to filter its own data, which has better filtering performance and better effects than the conventional one-sided scenario.

Figure 5:
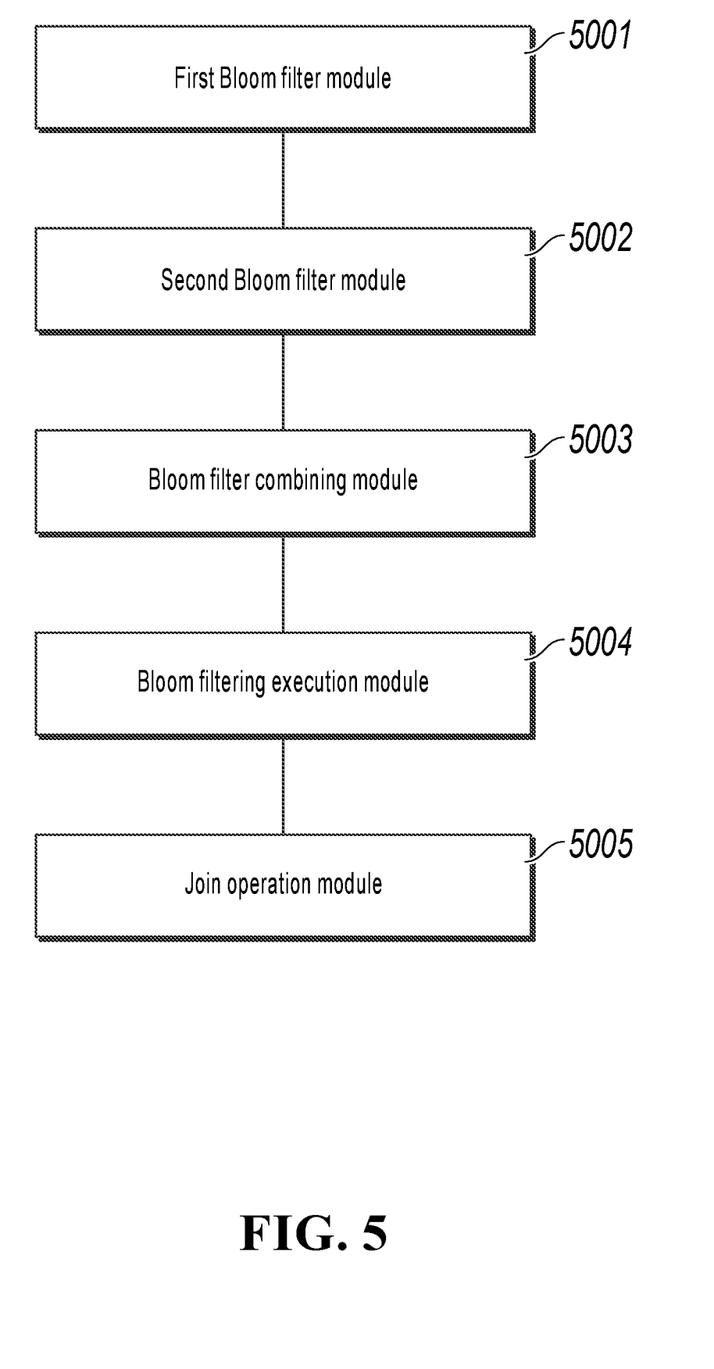
FIG. 5 is a schematic diagram illustrating an apparatus in a second aspect, according to an embodiment of the present specification.

According to a second aspect, based on the same inventive concept, an embodiment of the present specification provides a distributed join operation apparatus. As shown in FIG. 5, the apparatus includes the following: a first Bloom filter module 5001, configured to generate a first Bloom filter based on a data set of a local end, and send the first Bloom filter to a remote end; a second Bloom filter module 5002, configured to receive a second Bloom filter sent by the remote end, where the second Bloom filter is generated by the remote end based on a data set of the remote end; a Bloom filter combining module 5003, configured to filter data in the data set of the local end by using the first Bloom filter and the second Bloom filter; a Bloom filtering execution module 5004, configured to perform Bloom filtering on the data form of the local end by using a combined Bloom filter; and a join operation module 5005, configured to perform a join operation on unsuccessfully filtered data.

Optionally, the apparatus further includes a Bloom filter combining module, configured to combine the first Bloom filter and the second Bloom filter, where a combined Bloom filter is a bilateral Bloom filter; and the Bloom filtering execution module is configured to filter the data in the data set of the local end by using the bilateral Bloom filter.

Optionally, the first Bloom filter module is configured to: in a process of reading the data set of the local end, periodically generate a first Bloom filter and send the first Bloom filter to the remote end; the second Bloom filter module is configured to periodically receive a second Bloom filter sent by the remote end; the Bloom filter combining module is configured to: each time a second Bloom filter is received, combine the currently received second Bloom filter with a first Bloom filter that is generated most recently, or combine the currently received second Bloom filter with a Bloom filter currently used for Bloom filtering; and the Bloom filtering execution module is configured to filter the data in the data set of the local end by using a latest bilateral Bloom filter.

Optionally, the apparatus further includes a caching module, configured to cache successfully filtered data, where the Bloom filtering execution module is further configured to filter the cached data again by using a subsequently combined bilateral Bloom filter.

Optionally, the apparatus further includes an end of scanning instruction sending module, configured to send a first end of scanning instruction to the remote end when all data in the data set of the local end is read and no second end of scanning instruction sent by the remote end is received, where the Bloom filtering execution module is further configured to: after a second end of scanning instruction sent by the remote end is received, filter the data in the data set of the local end by using the first Bloom filter that is generated most recently.

According to a third aspect, an embodiment of the present specification further provides a computer device, including the following: a memory, configured to store a computer program; and a processor, configured to execute the computer program to perform the steps of the previously described method.

According to a fourth aspect, an embodiment of the present specification further provides a computer-readable storage medium. The computer-readable storage medium stores a computer program, and the computer program is executed by a processor to perform the steps of the previously described method.

The present specification is described with reference to the flowcharts and/or block diagrams of the method, the device (system), and the computer program product based on the embodiments of the present specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction device. The instruction device implements a specified function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present specification have been described, a person skilled in the art can make changes and modifications to these embodiments once they understand the basic inventive concept. Therefore, the following claims are intended to be construed as to cover the preferred embodiments and all changes and modifications falling within the scope of the present specification.

Clearly, a person skilled in the art can make various modifications and variations towards the present specification without departing from the spirit and scope of the present specification. The present specification is intended to cover these modifications and variations of the present specification provided that they fall within the scope of protection defined by the following claims and their equivalent technologies.

What is claimed is:

1. A computer-implemented method, comprising:
generating a first Bloom filter based on data of a local device, and sending the first Bloom filter to a remote device, wherein the first Bloom filter is periodically generated, and wherein generating the first Bloom filter in a current period comprises:
reading, in the current period, a predetermined quantity of data included in the data of the local device to create a new Bloom filter; and
combining the new Bloom filter corresponding to the current period with a previously created Bloom filter corresponding to a previous period to generate the first Bloom filter;

receiving a second Bloom filter from the remote device, wherein the second Bloom filter is generated by the remote device based on data of the remote device;

combining the first Bloom filter and the second Bloom filter to obtain a current bilateral Bloom filter;

filtering data of the local device using the current bilateral Bloom filter to produce a first set of filtered data that are not included in the current bilateral Bloom filter and a second set of filtered data that are included in the current bilateral Bloom filter;

storing the first set of filtered data into a cache, the first set of filtered data comprising the data of the local device that are not included in the current bilateral Bloom filter, wherein data stored in the cache are filtered using a subsequent bilateral Bloom filter; and performing a join operation on the second set of filtered data.

2. The computer-implemented method according to claim 1, wherein the first Bloom filter is periodically generated and sent to the remote device during a process of reading the data of the local device and the second Bloom filter is periodically received from the remote device.

3. The computer-implemented method according to claim 2, wherein combining the first Bloom filter and the second Bloom filter comprises:

for each periodically received second Bloom filter, combining a corresponding periodically received second Bloom filter with a most recent periodically generated first Bloom filter.

4. The computer-implemented method according to claim 3, wherein the method further comprises:

caching the first set of filtered data to produce cached data; and filtering the cached data by using a final bilateral Bloom filter.

5. The computer-implemented method according to claim 2, wherein combining the first Bloom filter and the second Bloom filter comprises:

for each periodically received second Bloom filter, combining a corresponding periodically received second Bloom filter with a most recently used bilateral Bloom filter for filtering the data of the local device to form an updated bilateral Bloom filter; and wherein filtering the data of the local device comprises filtering the data by using the updated bilateral Bloom filter.

6. The computer-implemented method according to claim 5, wherein the method further comprises:

caching the first set of filtered data to produce cached data; and filtering the cached data by using a subsequently formed updated bilateral Bloom filter.

7. The computer-implemented method according to claim 2, further comprising:

after the data of the local device is completely read by the local device and before a second end of file (EOF) indication is received from the remote device, sending a first end of file (EOF) indication to the remote device.

8. The computer-implemented method according to claim 7, further comprising:

after the second EOF indication is received from the remote device, filtering the data of the local device by using a most recently generated first Bloom filter.

9. A non-transitory, computer-readable medium storing one or more instructions executable by a computer system to perform operations comprising:

generating a first Bloom filter based on data of a local device, and sending the first Bloom filter to a remote device, wherein the first Bloom filter is periodically generated, and wherein generating the first Bloom filter in a current period comprises:

reading, in the current period, a predetermined quantity of data included in the data of the local device to create a new Bloom filter; and combining the new Bloom filter corresponding to the current period with a previously created Bloom filter corresponding to a previous period to generate the first Bloom filter;

receiving a second Bloom filter from the remote device, wherein the second Bloom filter is generated by the remote device based on data of the remote device;

combining the first Bloom filter and the second Bloom filter to obtain a current bilateral Bloom filter;

filtering data of the local device using the current bilateral Bloom filter to produce a first set of filtered data that are not included in the current bilateral Bloom filter and a second set of filtered data that are included in the current bilateral Bloom filter;

storing the first set of filtered data into a cache, the first set of filtered data comprising the data of the local device that are not included in the current bilateral Bloom filter, wherein data stored in the cache are filtered using a subsequent bilateral Bloom filter; and performing a join operation on the second set of filtered data.

10. The non-transitory, computer-readable medium according to claim 9, wherein the first Bloom filter is periodically generated and sent to the remote device during a process of reading the data of the local device and the second Bloom filter is periodically received from the remote device.

11. The non-transitory, computer-readable medium according to claim 10, wherein combining the first Bloom filter and the second Bloom filter comprises:

for each periodically received second Bloom filter, combining a corresponding periodically received second Bloom filter with a most recent periodically generated first Bloom filter.

12. The non-transitory, computer-readable medium according to claim 11, the operations further comprising:

caching the first set of filtered data to produce cached data; and filtering the cached data by using a final bilateral Bloom filter.

13. The non-transitory, computer-readable medium according to claim 10, wherein combining the first Bloom filter and the second Bloom filter comprises:

for each periodically received second Bloom filter, combining a corresponding periodically received second Bloom filter with a most recently used bilateral Bloom filter for filtering the data of the local device to form an updated bilateral Bloom filter; and wherein filtering the data of the local device comprises filtering the data by using the updated bilateral Bloom filter.

14. The non-transitory, computer-readable medium according to claim 13, the operations further comprising:

caching the first set of filtered data to produce cached data; and filtering the cached data by using a subsequently formed updated bilateral Bloom filter.

15. The non-transitory, computer-readable medium according to claim 10, the operations further comprising:

after the data of the local device is completely read by the local device and before a second EOF indication is received from the remote device, sending a first end of file (EOF) indication to the remote device.

16. The non-transitory, computer-readable medium according to claim 15, the operations further comprising:
after the second EOF indication is received from the remote device, filtering the data of the local device by using a most recently generated first Bloom filter.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
generating a first Bloom filter based on data of a local device, and sending the first Bloom filter to a remote device, wherein the first Bloom filter is periodically generated, and wherein generating the first Bloom filter in a current period comprises:
reading, in the current period, a predetermined quantity of data included in the data of the local device to create a new Bloom filter, and
combining the new Bloom filter corresponding to the current period with a previously created Bloom filter corresponding to a previous period to generate the first Bloom filter,
receiving a second Bloom filter from the remote device, wherein the second Bloom filter is generated by the remote device based on data of the remote device,
combining the first Bloom filter and the second Bloom filter to obtain a current bilateral Bloom filter,
filtering data of the local device using the current bilateral Bloom filter to produce a first set of filtered data that are not included in the current bilateral Bloom filter and a second set of filtered data that are included in the current bilateral Bloom filter,
storing the first set of filtered data into a cache, the first set of filtered data comprising the data of the local device that are not included in the current bilateral Bloom filter, wherein data stored in the cache are filtered using a subsequent bilateral Bloom filter, and
performing a join operation on the second set of filtered data.

18. The computer-implemented system according to claim 17, wherein the first bloom filter is periodically generated and sent to the remote device during a process of reading the data of the local device and the second Bloom filter is periodically received from the remote device.

* * * * *